April 24, 1962 W. E. PATTERSON ET AL 3,030,988
JIG FOR PREFABRICATING ROOF TRUSS
Filed Jan. 19, 1961 5 Sheets-Sheet 3
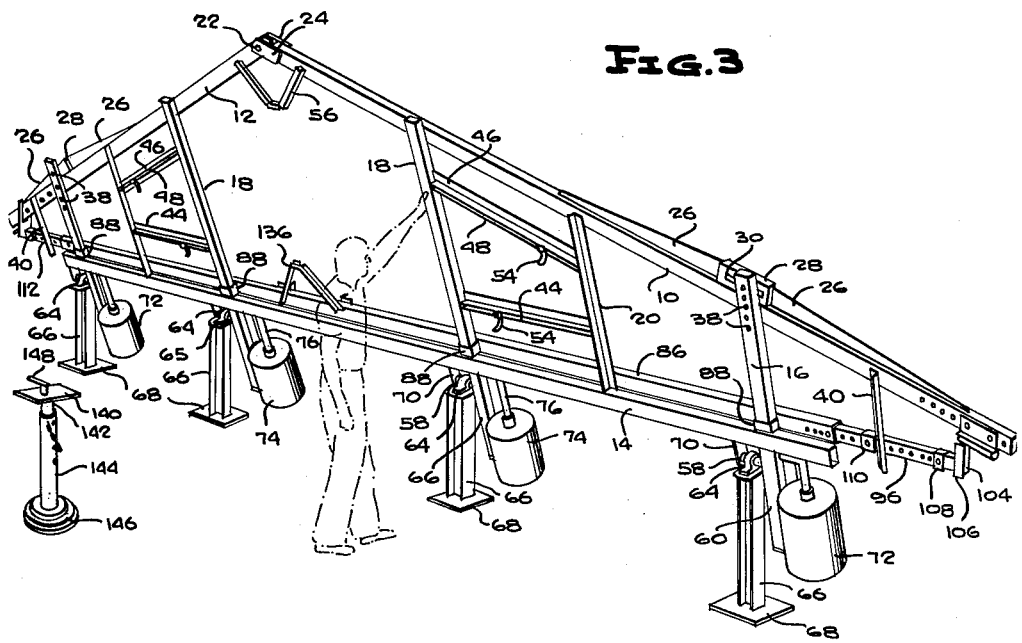
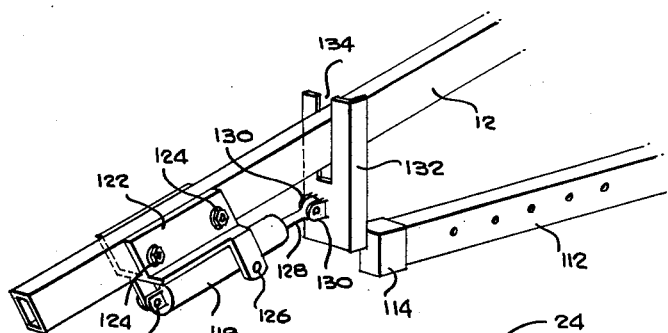
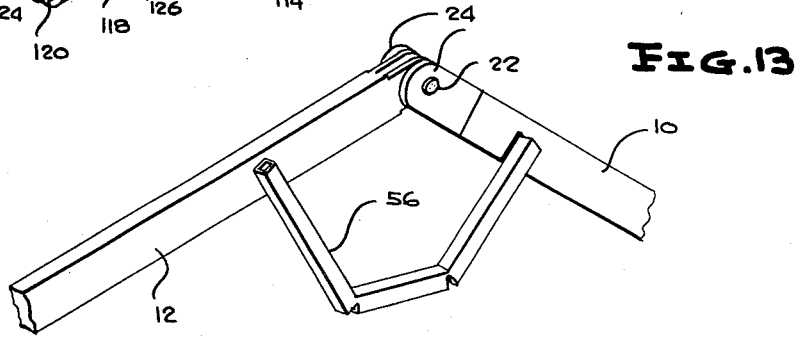
INVENTORS
WILLIAM E. PATTERSON, BOB E. TERRY,
MILTON J. BEATY, LARRY F. KERR
BY & MILFORD P. COLLINS
McMorrow, Berman & Davidson
ATTORNEYS

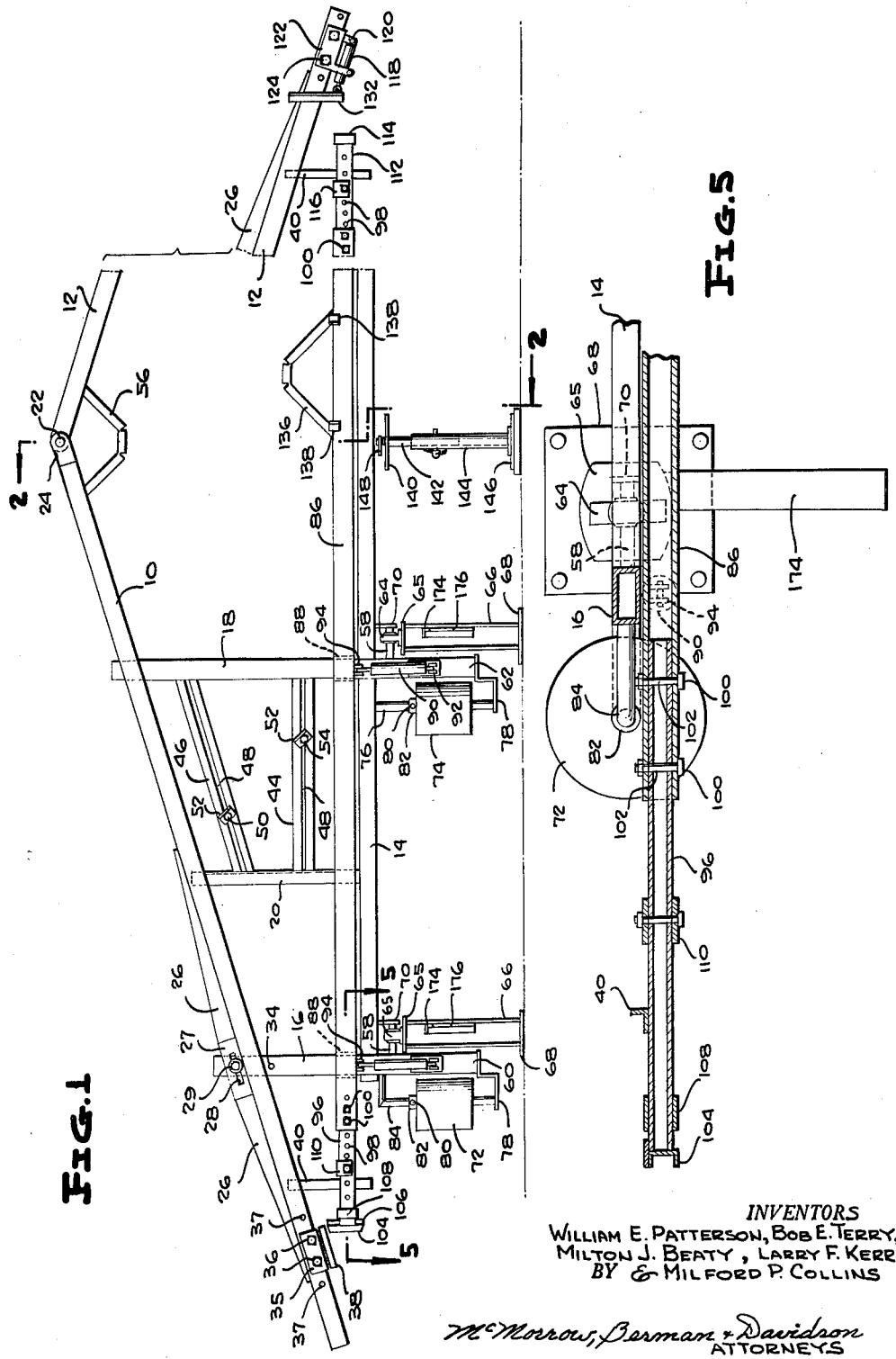

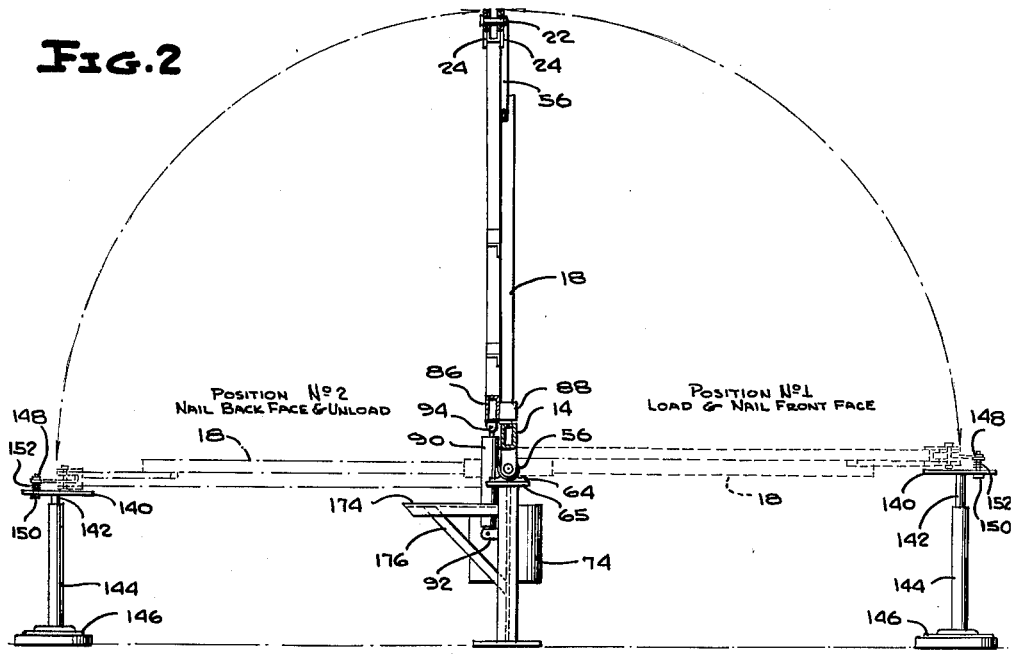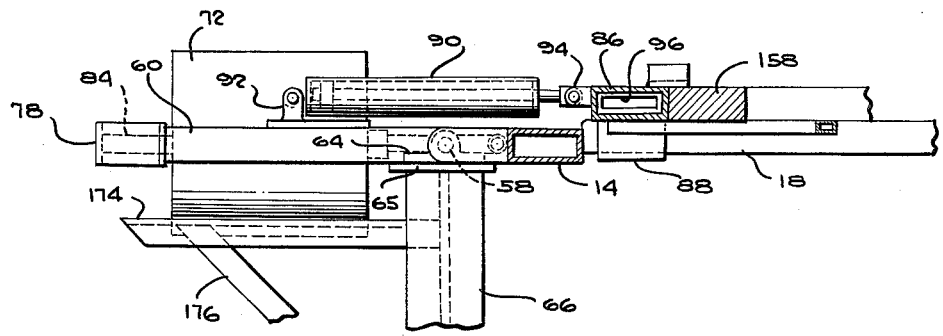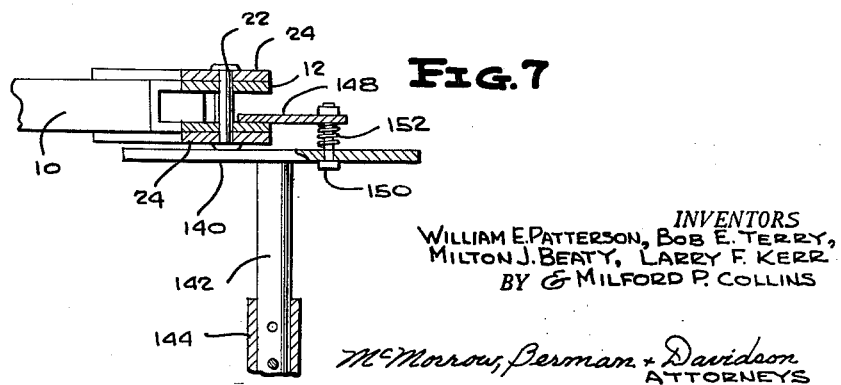

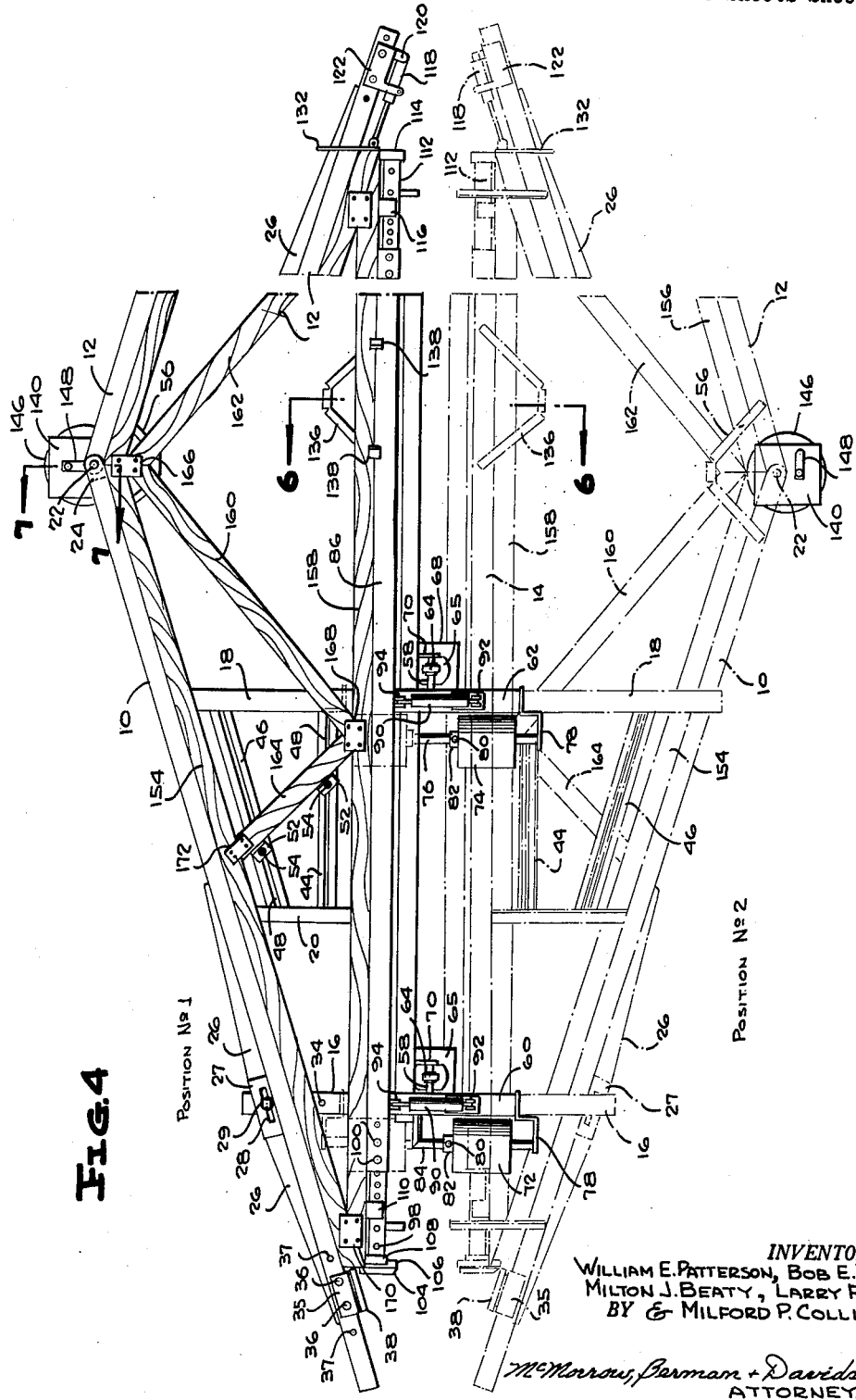

April 24, 1962     W. E. PATTERSON ET AL     3,030,988
JIG FOR PREFABRICATING ROOF TRUSS
Filed Jan. 19, 1961     5 Sheets-Sheet 5
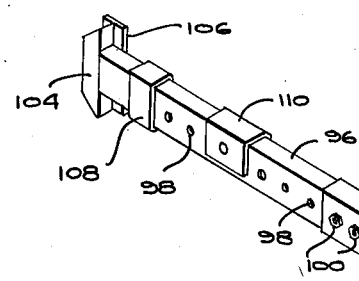
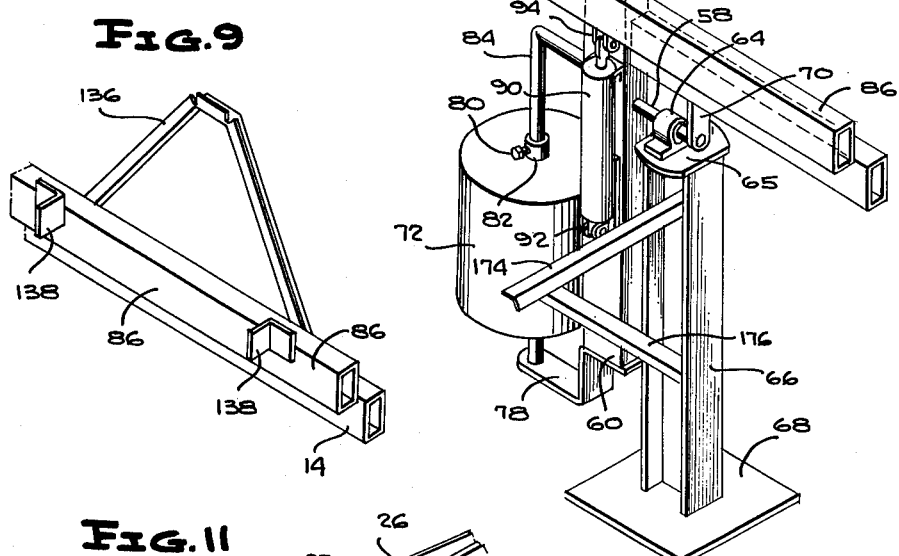
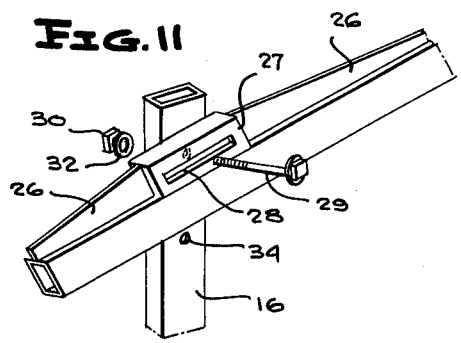
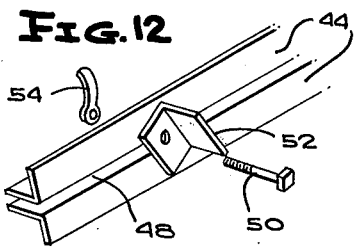
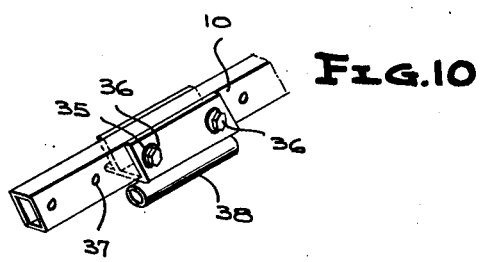
*INVENTORS*
WILLIAM E. PATTERSON, BOB E. TERRY,
MILTON J. BEATY, LARRY F. KERR.
BY &- MILFORD P. COLLINS
*McMorrow, German & Davidson*
ATTORNEYS

United States Patent Office 3,030,988
Patented Apr. 24, 1962

3,030,988
JIG FOR PREFABRICATING ROOF TRUSS
William E. Patterson, Phoenix, Bob E. Terry, Glendale, and Milton J. Beaty, Larry F. Kerr, and Milford P. Collins, Phoenix, Ariz., assignors to John F. Long Properties, Inc., a corporation of Arizona
Filed Jan. 19, 1961, Ser. No. 83,765
12 Claims. (Cl. 144—288)

This invention relates to prefabricated structures, and in particular to a jig for holding the elements of an A frame or other roof truss in proper layout assembly for uniting the parts by nailing.

It is an object of the invention to shorten the time, labor and expense involved in fabricating roof structures. A further object is to provide a jig for prefabricating roof trusses which is easy of manufacture, low in cost and readily manipulatable. Another object is to provide a jig involving minimum demands on factory space. A still further object is to provide a jig which is adjustable for different roof angles.

These and other objects are attained by the invention, which may be briefly described as an A-form rack with a slidable lower chord and which is pivotally mounted on an axis below and parallel to its lower chord for movement through 180° from one horizontal position to another, and being provided with counterweights beyond the axis of swing, the rafter elements being pivotally joined at the apex.

For a more detailed description of the invention, reference is made to the following specification as illustrated in the drawings, in which:

FIGURE 1 is a front elevational view of the jig on its swing mounting, foreshortened, and showing the jig vertically disposed, FIGURE 2 is a sectional view taken on the line 2—2 of FIGURE 1, the central line of symmetry of the jig, FIGURE 3 is a perspective view of the jig, shown in the process of being swung, FIGURE 4 is a view similar to FIGURE 1, showing the truss members in place in the jig, and showing, in broken lines, an adjusted position of the jig, FIGURE 5 (sheet 1) is a sectional view of a portion of the jig, taken on the line 5—5 of FIGURE 1, FIGURE 6 (sheet 2) is a sectional view of a detail, taken on the line 6—6 of FIGURE 4, FIGURE 7 is a sectional view of a detail taken on the line 7—7 of FIGURE 4, FIGURE 8 (sheet 5) is a perspective view of a detail of the frame showing the swing mounting and counterweight, FIGURE 9 is a perspective view of a detail showing a truss support medially of the lower chord of the jig, FIGURE 10 is a perspective view of a detail showing an end stop for the truss, FIGURE 11 is a perspective view of a detail showing an adjustment feature in the jig, FIGURE 12 is a perspective view of a detail showing another adjustment feature in the jig, FIGURE 13 (sheet 3) is a perspective view of a detail showing the pivot connection at the apex of the jig, and FIGURE 14 is a perspective view of a detail, showing the end, hydraulic thrust unit.

Referring to the drawings by characters of reference there is shown a rigid, triangular jig frame with slant sides 10, 12 and an offset transverse, bottom chord or base 14. The base carries, on each side of the center of the frame, a series of three uprights. Considering one half of the frame only, these uprights, which are conveniently secured to the base as by welding, comprise an outer post 16, an inner post 18, and an intermediate post 20. Of the frame members thus far mentioned, posts 20 are angle irons, and the others are rectangular, tubular stock, preferably 2 x 4 inches. The slant sides 10, 12 are pivoted together at the apex of the frame by means of a pin 22 contained in a bore in side 12 and engaging bores in a forked extension at the inner end of side 10 formed by a pair of plates 24 welded to the side 10. The slant members 10, 12 are connected to chord 14 to form a unitary structure by attachment to uprights 16 as by bolting, and for this purpose the upper side of each of the slant members is provided with a pair of triangular, reinforcing webs 26 on either side of an anchor block 27, having an elongate slot 28 (FIGURE 11) to receive the securing bolt 29, which is equipped with a nut 30 and washer 32. For adjustment, of the roof slant, the members 16 are provided with a series of bores 34, and sliding of the slant sides during such angular adjustment is compensated by the elongate slot 28. A channel-form rider 35, adjustably positionable along slant member 10 of the jig by means of bolts 36 received in bores 37 in the member, carries a tube 38 welded to its under side which serves as a limit stop, for one of the slant members of the truss.

As will be later evident, the uprights 16, 18, 20 form a lattice work which serves as a platform of dwell for the wooden truss members in the initial phase of layout and assembly. This supporting system is extended by a pair of angle irons 40 each of which is secured to and depends from one of the slant sides medially of the space between upright 16 and the outer, or eaves end of the jig.

For positioning the outer, diagonal struts of the truss, cross members 44, 46 are provided between each of the pairs of uprights 18 and 20, being secured thereto at their ends as by welding, with member 44 parallel to the lower chord and member 46 parallel to its associated slant side. As best seen in FIGURE 12 members 44 and 46 each comprise a pair of angle irons, with flanges in back-to-back relation and spaced apart to provide a slot 48 for sliding adjustment of a bolt 50, which secures an angle iron lug 52 to the cross member by means of a lever nut 54. The lugs form a two-point stop for orientation of the diagonal struts, and it will be observed that they are adjustable both along the slots, and angularly by rotation.

A V-form member 56, located at the apex of the triangular jig, forms a central support for the slant members of the truss, and in view of the swivel action this is attached to only one of the slant members 12, in this case, its other end being free to slide on the member 10. Alternatively, the member 56 could be in two parts, with ends fastened to the members 10, 12, respectivley.

The entire jig is mounted for swinging movement on four stub shafts 58 carried by lower extensions 60, 62 of uprights 16, 18, the shafts being journalled in pillow blocks 64 which are mounted on plates 65 on top of H-beam pedestals 66 carried on base flanges 68. Outer support for each shaft 58 is provided in an arm 70 secured to and depending from chordal beam 14.

The entire swinging system is counterbalanced by means of a pair of massive, cylindrical weights 72, 74 suspended from the system in each half of the jig. Weights 74 are slidably mounted on rods 76 (FIGURE 3) depending from the underside of beam 14 of the jig and supported transversely at its lower end by stepped straps 78 secured to the bottom face of extension 62, and the weights are adjustably positionable along the rods by means of set screws 80 in collars 82. Weights 72 are mounted on a shaft 84 having a right angle bend to reach the beam 14. The other parts associated with these weights are the same as those on weight 74 and have similar reference numerals. Preferably, the weights are adjusted so that the weight below the axis of swing is slightly greater than that above the axis. This results in effortless swing of the system, and leaves the jig in vertical position when idle.

It should be noted that the function of the beam 14 is to mount the uprights 16, 18 and 20. The actual, lower, transverse chord of the jig is a tubular beam 86, which, like beams 10, 12 and 14 is rectangular in cross-section, and which is mounted for powered, sliding movement in a direction perpendicular to its length, that is, in a direction lengthwise of uprights 16, 18 and 20, so as to compress the assembled layout of truss members firmly into place prior to nailing of the joint plates. The beam 86 is provided with U straps 88 (FIGURES 2, 6 and 8) which are slidably received on the beams 16 and 18 to hold beam 86 to the system while permitting its sliding movement. The movable beam 86 is urged toward the apex of the jig to compress the truss members, by means of hydraulic cylinders 90 pivoted in brackets 92 on the depending members 60, and with their piston rods pivoted on brackets 94 carried on the underside of beam 86.

For adjustability of length, the movable beam 86 has a telescopic arrangement at each end. As seen in FIGURE 5, a smaller tube 96 of square section is received in one end of beam 86 in a snug, sliding fit, and has a series of bores 98 adapted to register with bores 100 in the beam 86 to define different positions of adjustment, the parts being secured by bolts 102. A short length of channel bar 104 transverse to tube 98 on its end face, extends above the line of the top edge of beam 86 to provide a limit stop for the lower, chordal member of a truss, and has a plate 106 secured to one of its sides which extends inwardly of the channel base and serves as a support for the flat face of the truss member at its end. To compensate for the difference in width between tube 96 and tube 86, and therefore avoid bending of the chordal truss member, a sleeve 108 of the same size as tube 86 is affixed to tube 96 near its end, and an adjustable rider 110 is also mounted on tube 96 for positioning medially of the extended portion thereof. Similarly, at its other end, the beam 86 carries a telescoping tube 112, with fixed compensating sleeve 114 and adjustable compensating rider 116, but in lieu of a fixed stop a powered device is employed to compress the truss into tight engagement in the direction of length of lower, chordal beam 86 prior to nailing. For this purpose, a hydraulic cylinder 118 is secured by a pin 120 to a bracket 122 fastened by bolts 124 to the slant member 12 and held against outward swing by a pin 126 (FIGURE 14) carried by a pair of depending legs on the bracket. The piston rod 128 of the power cylinder is pivoted between a pair of lugs 130 extending from the outer face of a short length of angle bar 132 having a slot 134 in its upper edge, receiving the slant member 12. The face of the angle bar 132 having the slot is designed to furnish the thrust against the end of the thrust while the other face or flange furnishes support for the truss at its eaves end.

Central support for the lower, chordal member of the truss is provided in a loop 136 (FIGURE 1) of angle iron, in the general form of an inverted V, with the legs secured, as by welding, to one face of the movable beam 86. Lugs 138 of angle stock, secured to the opposite face of beam 86 and extending outwardly therefrom serve as retainers for the truss members supported on the shelf 136.

The jig has two working positions in the horizontal which are cyclically attained by swinging of the jig through 180° of arc. In each of these positions, a pedestal serves as a support for the vertex of the jig. Thus, in FIGURE 2, the first working position of the jig is shown, to the right of the figure, in broken lines. In this position, the vertex of the jig dwells on a table top 140 having a central shaft 142 telescopically received in a vertical tube 144 carried on a base 146. To overcome the slight amount of excess weight in the counterbalance the table top has a latch 148 (FIGURE 7) pivotally mounted on a vertical bolt 150 carried by the table top and held in spaced relation thereabove by a coil, compression spring 152, the latch being adapted to be swung into position above the jig after it has been lowered to a position contacting the table top. A similar arrangement is shown for the opposite position of the jig, the parts being indicated by the same reference numerals.

The manner of use of the jig will be apparent from FIGURE 4, wherein the solid lines show the jig in the first working position, with the jig swung from the vertical to a horizontal position, and the latch 148 swung into holding position. The slant members 154, 156 of the truss are laid in place on the support members 16, 18, 20, 40, 56 and 106, abutting the end limit stop 38 and the inner edges of slant jig elements 10 and 12, and with vertices coinciding. The lower chordal member 158 of the truss is then laid on the same vertical support members, with its lower edge in contact with the movable chordal member 86 of the jig. Thus located, the truss element 158 also has central support on the loop 136 and lies behind the keeper lugs 138. The central diagonal struts 160, 162 are then laid in place, in inverted V form, with apex coinciding with the inner apex of the slant members 154, 156, and dwelling on the platform 56, and with their outer ends dwelling on the support members 18 and contacting or closely adjacent to lower, chordal member 158. The outer diagonal members 164 are next laid in place across the support members 44, 46, with one side abutting the stop lugs 52 and their ends adjacent the slant member and the lower, chordal member. Obviously, the pieces may be laid down in any desired sequence.

In setting the slant member 154, the stop 35 is adjusted so that the peak of the member is at the vertex of the jig. This will not have to be adjusted again until a different length of material is used. The bottom stop 104 for the lower chordal member is then set to coincide with the stop 35.

Following the initial layout the hydraulic cylinders 90 and 118 are actuated through a suitable pressure supply and controls (not shown) to compress the truss members into tight assembly. The compacting in the two directions is almost simultaneous, but the flow control in the pressure system should be so arranged that the action of cylinder 118, moving the upper and lower chords sidewise into position, leads the action of cylinders 90, compressing the truss between base and apex, by a small amount, since otherwise the compacted struts might tend to hinder movement of the chords to proper position. After compacting, and while maintaining the pressure, connector plates are laid across the several butt joints, and nailed in place. Thus, as shown in FIGURE 4, a plate 166 is nailed over the joint at the vertex joint, another, 168 at each of the three-member joints where the diagonal struts meet the base member, another 170, at each end where a slant member meets the base, and another, 172, where the outer, diagonal struts meet the upper, slant members.

With all joint plates in place on one side, the jig is unlatched, turned through 180° to the position shown at the left in FIGURE 2, where it is again latched, and joint plates are nailed in place over each joint in opposite disposition to the plates mounted in the first operation.

With all plates in place, the cylinder pressure is removed, and the completed truss falls out, onto a conveyor or receiving table. As shown in the drawings (FIGURE 2), a receiving means for the lower chord of the truss is provided in a series of brackets 174, with braces 176, of angle iron, welded to the pedestals 66. After a small number of operations, the total time of the loading and nailing cycle for two operators is about 90 seconds.

Being conventional, the hydraulic system and its controls have not been illustrated. However, for completeness of disclosure, it is desired to point out that experience has indicated optimum performance with a pump of 100 gallons per minute, minimum; a pressure release with 500 pounds per square inch setting; a 2 gallon accumulator tank with a pressure compensating valve; and a 15 gallon hydraulic oil reservoir. These are arranged to maintain a pressure of 500 pounds per square inch to the jig at all times while in operation.

While a preferred embodiment of the invention has been shown and described, the same is not limited thereby, since various modifications will be apparent to those skilled in the art, in the light of this disclosure, and the invention should not, therefore, be deemed as limited except insofar as shall be reasonably inferred from the spirit and scope of the appended claims.

We claim:

1. A jig for prefabricating a roof truss or the like, comprising a generally triangular frame having a base and slant sides pivotally joined at the apex, a first upright carried by said base near each end thereof, means for connecting said uprights to said slant sides in adjusted angular positions of the latter, a pair of uprights carried by said base on each side of the frame between the first upright and the apex, a pair of cross members having guide slots extending between the members of each of said pairs of uprights, a positioning lug carried in each said slot and arranged for adjustment along said slots and in angular disposition, an extension of each of said first uprights and of one member of each of said pairs of uprights depending from said base, a series of pedestals carrying bearings, a horizontal shaft on each extension journalled in one of said bearings, and providing an axis of swing of said frame, a counterweight carried by each of said extensions, a movable base member slidably mounted on said uprights and co-planar with said slant sides, an adjustable, telescopic extension on each end of said movable base member, a laterally protruding flange on the outer end of one of said telescopic extensions, an adjustable limit stop on the slant side adjacent said one of said telescopic extensions, power means at the outer end of the other slant side, having a sweep means surrounding said other slant side for compacting movement of truss elements laid out in the jig, a pair of support means for truss elements, comprising a looped platform carried by the side face of one of said slant sides and extending inwardly of the frame in the vicinity of the apex and a looped platform carried by a side face of said movable base, medially thereof, lugs extending inwardly of said frame from the other side face of said movable base for holding truss elements in the frame, power means carried by said depending extensions and connected to said movable base for sliding it along said uprights, a supporting pedestal at each extremity of the path of swing of said apex, and latch means on said supporting pedestals adapted to engage and hold said frame.

2. A jig for prefabricating a roof truss or the like, comprising a generally triangular frame having a base and slant sides pivotally joined at the apex, a first upright carried by said base near each end thereof, means for connecting said uprights to said slant sides in adjusted angular positions of the latter, a pair of uprights carried by said base on each side of the frame between the first upright and the apex, a pair of cross members having guide slots extending between the members of each of said pairs of uprights, a positioning lug carried in each said slot and arranged for adjustment along said slots and in angular disposition, an extension of each of said first uprights and of one member of each of said pairs of uprights depending from said base, a series of pedestals carrying bearings, a horizontal shaft on each extension journalled in one of said bearings, and providing an axis of swing of said frame, a counterweight carried by each of said extensions, a movable base member slidably mounted on said uprights and co-planar with said slant sides, an adjustable, telescopic extension on each end of said movable base member, a laterally protruding flange on the outer end of one of said telescopic extensions, an adjustable limit stop on the slant side adjacent said one of said telescopic extensions, power means at the outer end of the other slant side, having a sweep means surrounding said other slant side for compacting movement of truss elements laid out in the jig, a pair of support means for truss elements, comprising a looped platform carried by the side face of one of said slant sides and extending inwardly of the frame in the vicinity of the apex and a looped platform carried by a side face of said movable base, medially thereof, lugs extending inwardly of said frame from the other side face of said movable base for holding truss elements in the frame, power means carried by said depending extensions and connected to said movable base for sliding it along said uprights, and a supporting pedestal at each extremity of the path of swing of said apex.

3. A jig for prefabricating a roof truss or the like, comprising a generally triangular frame having a base and slant sides pivotally joined at the apex, a first upright carried by said base near each end thereof, means for connecting said uprights to said slant sides in adjusted angular positions of the latter, a pair of uprights carried by said base on each side of the frame between the first upright and the apex, a pair of cross members having guide slots extending between the members of each of said pairs of uprights, a positioning lug carried in each said slot and arranged for adjustment along said slots and in angular disposition, an extension of each of said first uprights and of one member of each of said pairs of uprights depending from said base, a series of pedestals carrying bearings, a horizontal shaft on each extension journalled in one of said bearings, and providing an axis of swing of said frame a counterweight carried by each of said extensions, a movable base member slidably mounted on said uprights and co-planar with said slant sides, an adjustable, telescopic extension on each end of said movable base member, a laterally protruding flange on the outer end of one of said telescopic extensions, an adjustable limit stop on the slant side adjacent said one of said telescopic extensions, power means at the outer end of the other slant sides, having a sweep means surrounding said other slant side for compacting movement of truss elements laid out in the jig, support means for truss elements carried by the side face of one of said slant sides and extending inwardly of the frame in the vicinity of the apex, and by a side face of said movable base, medially thereof, lugs extending inwardly of said frame from the other side face of said movable base for holding truss elements in the frame, power means carried by said depending extensions and connected to said movable base for sliding it along said uprights, and a supporting pedestal at each extremity of the path of swing of said apex.

4. A jig for prefabricating a roof truss or the like, comprising a generally triangular frame having a base and slant sides pivotally joined at the apex, a first upright carried by said base near each end thereof, means for connecting said uprights to said slant sides in adjusted angular positions of the latter, a pair of uprights carried by said base on each side of the frame between the first upright and the apex, a pair of cross members having guide slots extending between the members of each of said pairs of uprights, a positioning lug carried in each said slot and arranged for adjustment along said slots and in angular disposition, an extension of each of said first uprights and of one member of each of said pairs of uprights depending from said base, a series of pedestals carrying bearings, a horizontal shaft on each extension journalled in one of said bearings, and providing an axis of swing of said frame a counterweight carried by each of said extensions, a movable base member slidably mounted on said uprights and co-planar with said slant sides, an adjustable, telescopic extension on each end of said movable base member, a laterally protruding flange on the outer end of one of said telescopic extensions, an adjustable limit stop on the slant side adjacent said one of said telescopic extensions, power means at the outer end of the other slant sides, having a sweep means surrounding said other slant side for compacting movement of truss elements laid out in the jig, support means for truss elements carried by the side face of one of said slant sides and extending inwardly of the frame in the vicinity of the apex, and by a side face of said movable base, medially thereof, lugs extending inwardly of said frame from the other side face of said movable base for holding truss elements in the frame, power means carried by said depending extensions and connected to said movable base for sliding it along said uprights.

5. A jig for prefabricating a roof truss or the like comprising a generally triangular frame having a base and slant sides pivotally joined at the apex, a first upright carried by said base near each end thereof, means for connecting said uprights to said slant sides in adjusted angular positions of the latter, a pair of uprights carried by said base on each side of the frame between the first upright and the apex, a pair of cross members having guide slots extending between the members of each of said pairs of uprights, a positioning lug carried in each said slot and arranged for adjustment along said slots and in angular disposition, an extension of each of said first uprights and of one member of each of said pairs of uprights depending from said base, means mounting said depending extensions for swinging movement of said frame on a horizontal axis, a counterweight carried by each of said extensions, a movable base member slidably mounted on said uprights and co-planar with said slant sides, an adjustable, telescopic extension on each end of said movable base member, a laterally protruding flange on the outer end of one of said telescopic extensions, an adjustable limit stop on the slant side adjacent said one of said telescopic extensions, power means at the outer end of the other slant side for compacting movement of truss elements laid out in the jig, support means for truss elements carried by the side face of one of said slant sides and extending inwardly of the frame in the vicinity of the apex, and by a side face of said movable base, medially thereof, lugs extending inwardly of said frame from the other side face of said movable base for holding truss elements in the frame, power means carried by said depending extensions and connected to said movable base for sliding it along said uprights.

6. A jig for prefabricating a roof truss or the like comprising a generally triangular frame having a base and slant sides pivotally joined at the apex, a first upright carried by said base near each end thereof, means for connecting said uprights to said slant sides in adjusted angular positions of the latter, a pair of uprights carried by said base on each side of the frame between the first upright and the apex, a pair of cross members having guide slots extending between the members of each of said pairs of uprights, a positioning lug carried in each said slot and arranged for adjustment along said slots and in angular disposition, an extension of each of said first uprights and of one member of each of said pairs of uprights depending from said base, means mounting said depending extensions for swinging movement of said frame on a horizontal axis, a counterweight carried by each of said extensions, a movable base member slidably mounted on said uprights and co-planar with said slant sides, a longitudinally adjustable limit stop on one end of said movable base member, an adjustable limit stop on the slant side adjacent said one end of said movable base, power means at the outer end of the other slant side for compacting movement of truss elements laid out in the jig, support means for truss elements carried by the side face of one of said slant sides and extending inwardly of the frame in the vicinity of the apex, and by a side face of said movable base, medially thereof, lugs extending inwardly of said frame from the other side face of said movable base for holding truss elements in the frame, power means carried by said depending extensions and connected to said movable base for sliding it along said uprights.

7. A jig for prefabricating a roof truss or the like comprising a generally triangular frame having slant sides pivotally joined at the apex and a base offset from the plane of said sides, a series of uprights carried by said base and slidably movable on one face of said sides, means for securing at least two of said uprights to said sides in adjusted positions of said frame, guide means associated with others of said uprights adjustable in two dimensions in the plane of said frame for positioning diagonal truss struts, adjustable limit stops for truss elements on one of said slant sides and on said base at one corner of said frame, a powered pusher element on the other of said slant sides at the other corner of said frame, a movable base slidably mounted on at least two of said uprights and movable in the plane of said slant sides to and from the apex of the frame, a plurality of arms depending from the offset base, means mounting said arms for swinging movement of said frame about a horizontal axis, power means carried by said arm and connected to said movable base for imparting sliding movement thereto, and counterweights carried by said arms on the side of said axis opposite from said frame.

8. A jig for prefabricating a roof truss or the like comprising a generally triangular frame having slant sides joined at the apex and a base offset from the plane of said sides, a series of uprights carried by said base and slidably movable on one face of said sides, means for securing at least two of said uprights to said sides in adjusted positions of said frame, guide means associated with others of said uprights adjustable in two dimensions in the plane of said frame for positioning diagonal truss struts, adjustable limit stops for truss elements on one of said slant sides and on said base at one corner of said frame, a powered pusher element on the other of said slant sides at the other corner of said frame, a movable base slidably mounted on at least two of said uprights and movable in the plane of said slant sides to and from the apex of the frame, a plurality of arms depending from the offset base, means mounting said arms for swinging movement of said frame about a horizontal axis, power means carried by said arm and connected to said movable base for imparting sliding movement thereto, and counterweights carried by said arms on the side of said axis opposite from said frame.

9. A jig for prefabricating a roof truss or the like comprising a generally triangular frame having slant sides joined at the apex and a base offset from the plane of said sides, a series of uprights carried by said base and slidably movable on one face of said sides, means for securing at least two of said uprights to said sides in adjusted positions of said frame, guide means associated with others of said uprights adjustable in two dimensions in the plane of said frame for positioning diagonal truss struts, adjustable limit stops for truss elements on one of said slant sides and on said base at one corner of said frame, a powered pusher element on the other of said slant sides at the other corner of said frame, a movable base slidably mounted on at least two of said uprights and movable in the plane of said slant sides, means mounting said frame for swinging movement about a horizontal axis located below said offset base, power means carried by said frame and connected to said movable base for imparting sliding movement thereto, and counterweights carried by said frame, and located on the side of said axis opposite from said offset base.

10. A jig for prefabricating a roof truss or the like comprising a generally triangular frame having slant sides joined at the apex and a base offset from the plane of said sides, a series of uprights carried by said base and slidably movable on one face of said sides, means for securing at least two of said uprights to said sides in adjusted positions of said frame, adjustable limit stops for truss elements on one of said slant sides and on said base at one corner of said frame, a powered pusher element on the other of said slant sides at the other corner of said frame, a movable base slidably mounted on at least two of said uprights and movable in the plane of said slant sides, means mounting said frame for swinging movement about a horizontal axis located below said offset base, power means carried by said frame and connected to said movable base for imparting sliding movement thereto, and counterweights carried by said frame, and located on the side of said axis opposite from said offset base.

11. A jig for prefabricating a roof truss or the like comprising a generally triangular frame having slant sides joined at the apex and a base offset from the plane of said sides, a series of uprights carried by said base and slidably movable on one face of said sides, means for securing at least two of said uprights to said sides in adjusted positions of said frame, limit stops for truss elements on one of said slant sides and on said base at one corner of said frame, a powered pusher element on the other of said slant sides at the other corner of said frame, a movable base slidably mounted on at least two of said uprights and movable in the plane of said slant sides, means mounting said frame for swinging movement about a horizontal axis located below said offset base, power means carried by said frame and connected to said movable base for imparting sliding movement thereto, and counterweights carried by said frame, and located on the side of said axis opposite from said offset base.

12. A jig for prefabricating a roof truss or the like comprising a generally triangular frame having slant sides joined at the apex and a base offset from the plane of said sides, a series of uprights carried by said base and slidably movable on one face of said sides, means for securing at least two of said uprights to said sides in adjusted positions of said frame, a powered pusher element on the other of said slant sides at the other corner of said frame, a movable base slidably mounted on at least two of said uprights and movable in the plane of said slant sides, means mounting said frame for swinging movement about a horizontal axis located below said offset base, power means carried by said frame and connected to said movable base for imparting sliding movement thereto, and counterweights carried by said frame, and located on the side of said axis opposite from said offset base.

References Cited in the file of this patent

UNITED STATES PATENTS

| | | |
|---|---|---|
| 2,305,124 | Wilson et al. | Dec. 15, 1942 |
| 2,427,133 | Grabner | Sept. 9, 1947 |
| 2,592,359 | Valiton et al. | Apr. 8, 1952 |
| 2,626,643 | Kantzler | Jan. 27, 1953 |
| 2,919,733 | Johnson | Jan. 5, 1960 |
| 2,973,022 | Danielsen et al. | Feb. 28, 1961 |
| 2,983,292 | McKinley | May 9, 1961 |